United States Patent
Benco et al.

(10) Patent No.: US 7,068,997 B2
(45) Date of Patent: Jun. 27, 2006

(54) METHOD FOR DISPLAYING ROAMING CHARGE RATE ON MOBILE STATION

(75) Inventors: David S. Benco, Winfield, IL (US); Kevin J. Overend, Elmhurst, IL (US); Baoling S. Sheen, Naperville, IL (US); Sandra L. True, St. Charles, IL (US); Kenneth J. Voight, Sugar Grove, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 290 days.

(21) Appl. No.: 10/633,787

(22) Filed: Aug. 4, 2003

(65) Prior Publication Data
US 2005/0043012 A1    Feb. 24, 2005

(51) Int. Cl.
*H04M 11/00* (2006.01)

(52) U.S. Cl. .................. 455/407; 455/406; 455/432.1; 379/114.01; 379/114.03

(58) Field of Classification Search ................ 455/407, 455/406, 432.1, 405, 433; 379/114.01, 114.03
See application file for complete search history.

(56) References Cited

U.S. PATENT DOCUMENTS

| 2003/0083067 | A1* | 5/2003 | Hanson ...................... 455/433 |
| 2004/0063422 | A1* | 4/2004 | Nickum ...................... 455/405 |
| 2004/0097220 | A1* | 5/2004 | McGregor et al. .......... 455/419 |
| 2004/0203744 | A1* | 10/2004 | Hicks et al. ............. 455/432.1 |
| 2005/0032505 | A1* | 2/2005 | Himelhoch ................. 455/405 |
| 2005/0113113 | A1* | 5/2005 | Reed ....................... 455/456.3 |

* cited by examiner

Primary Examiner—Danh Cong Le

(57) ABSTRACT

A method for displaying a roaming charge rate on a mobile station in a wireless network is provided. The mobile station is associated with a subscriber to wireless services from a wireless service provider associated with the wireless network. In one embodiment, the wireless network includes a mobile switching center, a subscriber database, a base station, and mobile station. In one embodiment, the method includes: a) while the mobile station is located in a current geographic area, determining the mobile station is roaming, b) determining a roaming charge will be incurred by the subscriber when using the mobile station in the current geographic area, c) communicating a roaming charge rate associated with the roaming charge that would be incurred to the mobile station, and d) displaying the roaming charge rate on a display associated with the mobile station while the mobile station is located in the current geographic area.

18 Claims, 2 Drawing Sheets

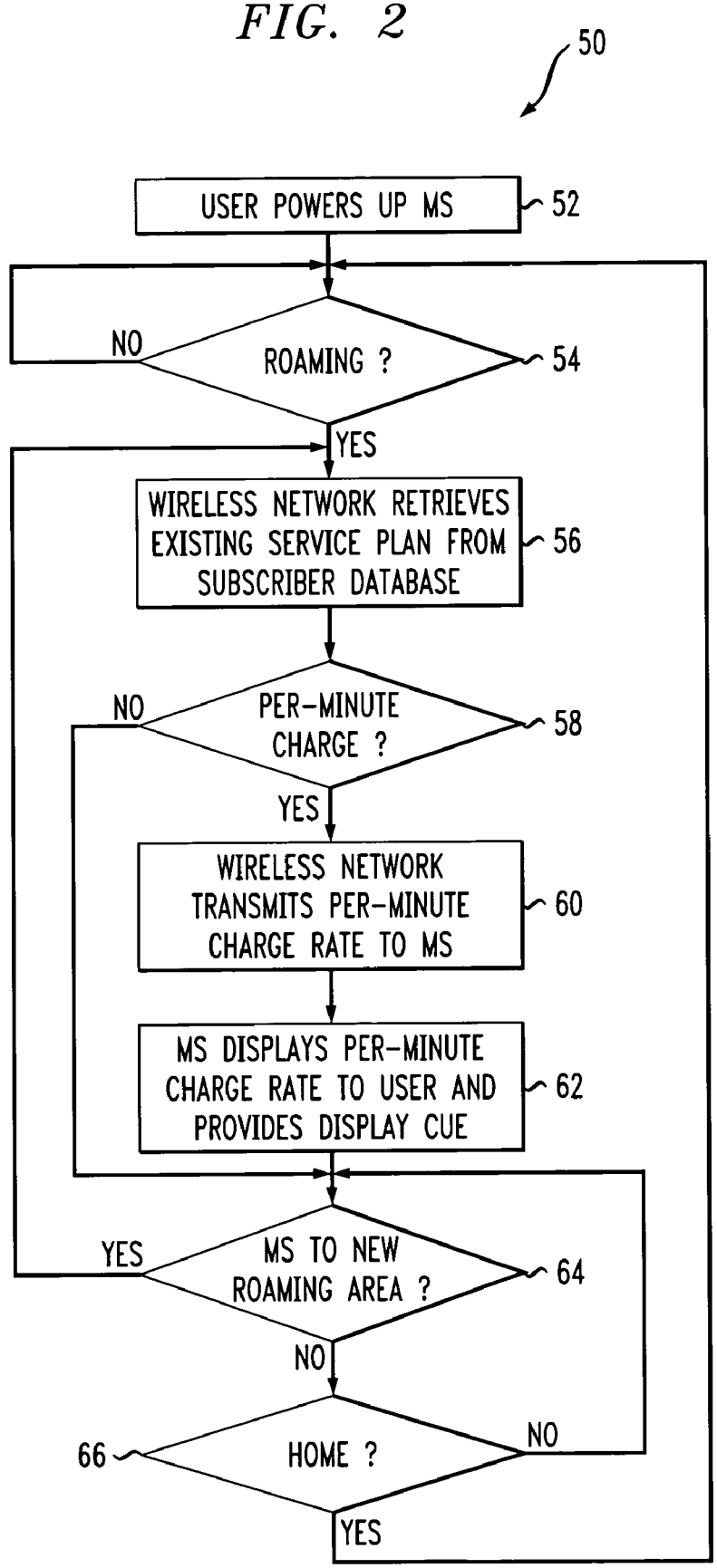

METHOD FOR DISPLAYING ROAMING CHARGE RATE ON MOBILE STATION

BACKGROUND OF INVENTION

The invention generally relates to a wireless network with a mobile station (MS) and, more particularly, to a method for displaying a roaming charge rate on an MS and will be described with particular reference thereto. However, it is to be appreciated that the invention is also amenable to other applications.

Mobile subscribers have service plans with a certain wireless service provider for access to a wireless network, which, in turn, provides access to a public switched telephone network (PSTN) and, potentially, other wireless networks. The wireless network associated with the subscriber's wireless service provider is known as a home wireless network. The home wireless network covers a certain geographic area that may be referred to as a home coverage area. When the MS is taken outside the home coverage area and into an area covered by another wireless network, it is said to be roaming. The wireless network in which the MS is roaming is known as a visited wireless network.

Many subscribers are assessed a roaming charge when the MS is used in a visited wireless network. Typically, the roaming charge is based on a per-minute rate (e.g., $ 0.35/minute, $1.50/minute, etc.). When roaming, the MS may inform users that they are outside of the home coverage area with a simple "roam" indication on a display. The problem is that often the user or subscriber does not have the latest information on what the roaming charge rate is for the visited network. Coverage maps are usually not accurate or up-to-date and, in some areas, a user that is traveling can quickly roam into several visited wireless networks, each network potentially having different roaming charge rates.

As a result, not knowing the roaming charge rates they may be charged for using the MS, subscribers or users carrying a MS that indicates it is roaming often refrain from placing calls and may choose to not answer in-coming calls until they return to a home coverage area. This unnecessarily inconveniences the subscriber or user and contributes to lost revenue for wireless service providers when the roaming charge rate was low enough that the subscriber or user would have used the MS if he or she had known the rate.

Thus, there is motivation for a method for displaying a roaming charge rate on an MS.

BRIEF SUMMARY OF INVENTION

In one aspect of the invention, a method for displaying a roaming charge rate on a mobile station is provided. The mobile station is associated with a wireless network and a subscriber to wireless services from a wireless service provider associated with the wireless network. The method includes: a) while the mobile station is located in a current geographic area, determining if the mobile station is roaming, b) determining if a roaming charge will be incurred by the subscriber when using the mobile station in the current geographic area, and c) communicating a roaming charge rate associated with the roaming charge that would be incurred to the mobile station such that the roaming charge rate is displayed on a display associated with the mobile station while the mobile station is located in the current geographic area.

In another aspect of the invention, a method for displaying a per-minute roaming charge on a mobile station is provided. The mobile station is associated with a wireless network and a subscriber to wireless services from a wireless service provider associated with the wireless network. The method includes: a) while the mobile station is located in a current geographic area, determining the mobile station is roaming, b) retrieving at least a portion of an existing service plan between the subscriber and the wireless service provider from a subscriber database, c) determining a per-minute roaming charge will be incurred by the subscriber when using the mobile station in the current geographic area, d) communicating the per-minute roaming charge to the mobile station, e) displaying the per-minute roaming charge on a display associated with the mobile station while the mobile station is located in the current geographic area, f) while the mobile station is located in a different geographic area, determining the mobile station is roaming, and g) repeating steps b)–e) for the different geographic area while the mobile station is powered up.

In still another aspect of the invention, a wireless network is provided. The wireless network includes: a mobile station associated with a subscriber to wireless services from a wireless service provider associated with the wireless network, means for determining the mobile station is roaming while the mobile station is located in a current geographic area, means for displaying a per-minute roaming charge on the mobile station while the mobile station is located in the current geographic area, a subscriber database for storing an existing service plan between the subscriber and the wireless service provider, means for retrieving at least a portion of the existing service plan from the subscriber database, means for determining a per-minute roaming charge will be incurred by the subscriber when using the mobile station in the current geographic area, and means for communicating the per-minute roaming charge to the mobile station.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

FIG. 2 is a flowchart of an embodiment of a method for displaying a per-minute roaming charge on a mobile station within a wireless network.

DETAILED DESCRIPTION

Figure 1:
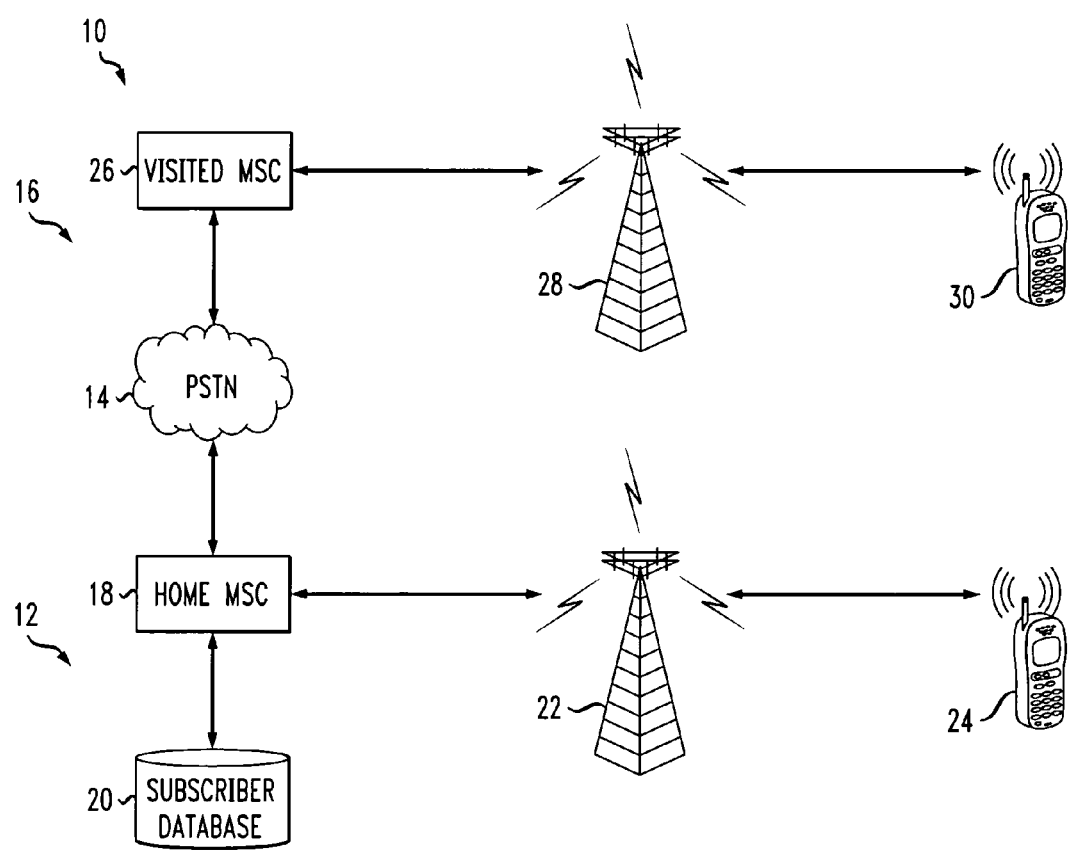
FIG. 1 is a block diagram of an embodiment of a telecommunication system incorporating one aspect of the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangement of components and in various steps and arrangement of steps beyond those provided in the drawings and associated description. In the drawings, like reference numerals denote like elements and similar reference numerals denote similar elements.

With reference to FIG. 1, a telecommunication system 10 includes a home wireless network 12, a PSTN 14, and a visited wireless network 16. The home wireless network 12 includes one or more home mobile switching centers (MSCs) 18, a subscriber database 20, one or more base stations (BSs) 22, and one or more MSs 24 located within a geographic area covered by the home wireless network. The visited wireless network 16 includes one or more visited MSCs 26, one or more base stations (BSs) 28, and one or more MSs 30 located within a geographic area covered by the visited wireless network.

In the embodiment being described, the MSs 24, 30 are both associated with subscribers having service plans with a wireless service provider associated with the home wireless network 12. Hence, the first MS 24 is not roaming and the second MS 30 is roaming. While both MSs 24, 30 may be capable of displaying roaming charge rates, only the second MS 30 is currently displaying a roaming charge rate to the subscriber or another user associated with the MS 30 because the first MS 24 is not roaming.

In general, when one of the MSs (i.e., 24, 30) travels outside the subscriber's service plan area (i.e., home wireless network 12) into the visited wireless network 16, the visited MSC 26 contacts the home MSC 18 via the PSTN 14 for account information from the subscriber database 20. The home MSC 18 checks the subscriber account information and determines what the roaming charge rate (e.g., per-minute roaming charge) on the visited wireless network 16 is and relays this data to the visited MSC 26 via the PSTN 14. The visited MSC 26 communicates the roaming charge rate to the MS 30 via the BS 28 for display to the subscriber or user.

If roaming subscribers or users are informed of the applicable roaming charge rates outside their home coverage area and feel the cost are reasonable, they may use the MS more often while roaming. This is more efficient for the subscriber or user and may result in increased revenue for the wireless service providers.

With reference to FIG. 2, a process 50 for displaying, for example, a per-minute roaming charge on a mobile station begins at step 52 when a user powers up the MS. The MS is associated with a subscriber having an existing service plan with a service provider associated with a home wireless network. Next, at step 54, a wireless network serving the MS determines if the MS is roaming based on its current geographic location. If the MS is roaming, the wireless network retrieves an existing service plan from a subscriber database (step 56). Typically, the subscriber database is accessed by the home wireless network and certain information (e.g., roaming charge rate applicable to the MSC serving the MS) is communicated to the MSC serving the MS.

Next, at step 58, based on the information from the subscriber's existing service plan, the wireless network determines if, for example, a per-minute roaming charge applies to the MS based on its current geographic location. Alternate roaming charge rates may also be implemented. For example, a unit less than a minute, such as 30 seconds, or an increment greater than a minute, such as two minutes. If, for example, a per-minute roaming charge rate applies, at step 60, the wireless network transmits, for example, the per-minute roaming charge rate to the MS. Next, at step 62, the MS displays the per-minute roaming charge rate to the user and provides a cue indicating that a new roaming charge rate is displayed. The cue may be an audible cue, such as a tone, an visual cue, such as an indicator or display, a vibratory cue, such as a pager-like vibration applied to the MS, or any combination thereof Next, at step 64, the wireless network determines when the MS enters a new roaming area. If the MS enters a new roaming area, the process returns to step 56. Otherwise, at step 66, the wireless network determines if the MS has entered a home coverage area. If the MS has entered a home coverage area, the process returns to step 54. Otherwise, the process returns to step 64.

At step 54, if the wireless network determines the MS is not roaming, the process repeats step 54.

At step 58, if the wireless network determines that a roaming charge rate does not applies to the MS based on its current location, the process advances to step 64.

In summary, the wireless network automatically sends data to the MS to display, for example, the per-minute roaming charge rate a subscriber would pay for calls when traveling outside of their service plan area. This allows the wireless network to determine the per-minute roaming charge in effect whenever the MS enters a visited wireless network. The wireless network sends the per-minute roaming charge rate to the MS for display.

More specifically, this provides a way for the mobile subscriber to be automatically informed of per-minute roaming fees that will be charged to his/her account when roaming off network or outside of their home service plan area. The wireless network software determines when a subscriber has either traveled out of their home coverage area or powered-up outside of this area. The wireless network software also determines the identity of the visited wireless network and looks up the per-minute roaming charge rate that is in effect for the subscriber while in the geographic area covered by the visited wireless network.

The wireless network sends the per-minute roaming charge rate information to the subscriber's MS, which displays it to the user, for example as "Roaming Rate: $0.35/min." If the MS has roamed to yet another network or anywhere the per-minute roaming charge rate changed, the wireless network software takes note of the change and sends another message to the MS to display the updated per-minute roaming charge rate. The wireless network determines when the MS travels back to or powers-up again in their home coverage area and sends a message to the MS to stop displaying the per-minute roaming charge rate and return to a default display message for the user's service plan coverage area.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

We claim:

1. A method for displaying a roaming charge rate on a mobile station, the mobile station being associated with a wireless network and a subscriber to wireless services from a wireless service provider associated with the wireless network, the method including the steps:
   a) while the mobile station is located in a current geographic area, determining if the mobile station is roaming;
   b) determining if a roaming charge applies to the mobile station based on the current geographic area; and
   c) communicating a roaming charge rate to the mobile station upon determining that the roaming charge rate applies to the mobile station such that the roaming charge rate is displayed on a display associated with the mobile station while the mobile station is located in the current geographic area.

2. The method as set forth in claim 1, between steps a) and b), the method further including:
retrieving at least a portion of an existing service plan between the subscriber and the wireless service provider from a subscriber database.

3. The method as set forth in claim 2, wherein the retrieved portion includes a roaming charge rate associated with the current geographic area.

4. The method as set forth in claim 1, further including:
d) while the mobile station is located in a different geographic area, determining the mobile station is roaming; and
e) repeating steps b) and c) for the different geographic area while the mobile station is powered up.

5. The method as set forth in claim 4, between steps a) and b), the method further including:
retrieving at least a portion of an existing service plan between the subscriber and the wireless service provider from a subscriber database.

6. The method as set forth in claim 5, wherein the retrieved portion includes a roaming charge rate associated with the current geographic area.

7. The method as set forth in claim 4, step c) further including:
providing a cue to a user associated with the mobile station indicating a new roaming charge rate is displayed on the mobile station.

8. The method as set forth in claim 7 wherein the cue is at least one of an audible cue, an indicator cue, and a vibratory cue.

9. The method as set forth in claim 7 wherein the cue is provided for a predetermined time period.

10. A method for displaying a roaming charge rate on a mobile station, the mobile station being associated with a wireless network and a subscriber to wireless services from a wireless service provider associated with the wireless network, the method including the steps:
a) while the mobile station is located in a current geographic area, determining the mobile station is roaming;
b) retrieving at least a portion of an existing service plan between the subscriber and the wireless service provider from a subscriber database;
c) determining a roaming charge rate will be incurred by the subscriber when using the mobile station in the current geographic area;
d) communicating the roaming charge rate to the mobile station upon determining that the roaming charge rate applies to the mobile station;
e) displaying the roaming charge rate on a display associated with the mobile station while the mobile station is located in the current geographic area;
f) while the mobile station is located in a different geographic area, determining the mobile station is roaming; and
g) repeating steps b)–e) for the different geographic area while the mobile station is powered up.

11. The method as set forth in claim 10 wherein the retrieved portion includes a roaming charge rate associated with the current geographic area.

12. The method as set forth in claim 11, step e) further including:
providing a cue to a user associated with the mobile station indicating a new roaming charge rate is displayed on the mobile station.

13. The method as set forth in claim 12 wherein the cue is at least one of an audible cue, an indicator cue, and a vibratory cue.

14. The method as set forth in claim 13 wherein the cue is provided for a predetermined time period.

15. A wireless network, including:
a mobile station associated with a subscriber to wireless services from a wireless service provider associated with the wireless network;
means for determining the mobile station is roaming while the mobile station is located in a current geographic area;
means for displaying a roaming charge rate on the mobile station while the mobile station is located in the current geographic area;
a subscriber database for storing an existing service plan between the subscriber and the wireless service provider;
means for retrieving at least a portion of the existing service plan from the subscriber database;
means for determining a roaming charge rate will be incurred by the subscriber when using the mobile station in the current geographic area; and
means for communicating the roaming charge rate to the mobile station upon determining that the roaming charge rate applies to the mobile station or upon the mobile station entering a new roaming area.

16. The wireless network as set forth in claim 15 wherein the retrieved portion includes a roaming charge rate associated with the current geographic area.

17. The wireless network as set forth in claim 15, further including:
means for providing a cue to a user associated with the mobile station indicating a new roaming charge rate is displayed on the mobile station.

18. The wireless network as set forth in claim 17 wherein the cue is at least one of an audible cue, an indicator cue, and a vibratory cue.

* * * * *